United States Patent [19]

Kawai et al.

[11] Patent Number: 5,079,632
[45] Date of Patent: Jan. 7, 1992

[54] WIDESCREEN TIME-COMPRESSED/TIME-EXPANDED TELEVISION SIGNAL TRANSMITTING/RECEIVING SYSTEM

[75] Inventors: Kiyoyuki Kawai; Seijiro Yasuki, both of Kanagawa, Japan

[73] Assignee: Kawasaki Kaisha Toshiba, Kawasaki, Japan

[21] Appl. No.: 532,676

[22] Filed: Jun. 4, 1990

[30] Foreign Application Priority Data

Jun. 7, 1989 [JP] Japan ................................. 1-144945

[51] Int. Cl.⁵ .............................................. H04N 7/24
[52] U.S. Cl. ...................................... 358/141; 358/12
[58] Field of Search .................... 358/141, 142, 12, 11, 358/167, 140, 180

[56] References Cited

U.S. PATENT DOCUMENTS

| | | | |
|---|---|---|---|
| 4,551,754 | 11/1985 | Meise et al. ........................ | 358/180 |
| 4,782,383 | 11/1988 | Isnardi .................................. | 358/12 |
| 4,884,127 | 11/1989 | Isnardi et al. ........................ | 358/141 |
| 4,908,697 | 3/1990 | Tsinberg et al. ................. | 358/141 X |

OTHER PUBLICATIONS

K. Kawai et al., "A Wide Screen EDTV", IEEE Transactions on Consumer Electronics, vol. 35, No. 3, pp. 133–141, Aug. 1989.

Primary Examiner—Victor R. Kostak
Attorney, Agent, or Firm—Foley & Lardner

[57] ABSTRACT

A compatible widescreen television signal transmission system includes a device for separating a widescreen television signal into a center panel signal component and left and right side panel signal components. The left and right panel signal components are preemphasized. A compatible widescreen television signal receiving system includes a device for time-division demultipling the widescreen television signal into the center panel signal component and the left and right side panel signal components. The left and right panel signal components are deemphasized.

18 Claims, 8 Drawing Sheets

$$\frac{Y}{X} = \frac{1}{1+k\,Z^{-2}}$$

$$\frac{Y}{X} = 1 + kZ^{-2}$$

WIDESCREEN TIME-COMPRESSED/TIME-EXPANDED TELEVISION SIGNAL TRANSMITTING/RECEIVING SYSTEM

BACKGROUND OF THE INVENTION

1. Field of the Invention

The present invention relates, in general, to a widescreen television signal transmitting/receiving system, and more particularly to a television signal transmitting/receiving system that transmits the time-compressed television signal at the transmitting side and outputs a time-expanded received signal at the receiving side.

2. Description of the Related Art

Recently, in the television broadcasting arts, what is called a wide aspect system is developed. The wide aspect system displays a picture which has a larger aspect ratio than existing NTSC systems. If the wide screen television signal is received without change and displayed by an existing television receiver, a circle will be reproduced as an ellipse in which the length is longer than the width.

Accordingly, as to this wide aspect system, some proposals have been made to assure its compatibility with the existing systems. One of the ways to achieve compatibility is as follows. The wide picture (screen) is divided into a center panel portion and two side panel portions. Further, the signals of the side panel portions are time-division multiplexed within the horizontal blanking period of the signal of the center panel portion, as disclosed in U.S. Pat. No. 4,551,754. By this means, an existing television receiver which has an aspect ratio of 4:3 is capable of reproducing the picture, which has as its aspect ratio 4:3, using only the signal of the center panel portion. The wide picture signal (e.g. the aspect ratio is 16:9) and the multiple signal described above have the same number of scanning lines and field frequency. Therefore, the center panel signal which is divided from the wide picture signal is time-expanded and the side panel signals which are divided from the wide picture signal is time-compressed. Almost all of the existing television receivers which are on sale have an over scanning area in the horizontal direction. Therefore, the reproduced picture of the time-compressed side panel signals appears within the over scanning area. As a result, none of the side panel signals appear on the picture display area of the receiver. But when the wide picture signal is reproduced on the wide screened receiver, the received signal from the transmitter is processed using the reverse of the above procedures and the picture is then reproduced. At the receiving side, the signal of center panel is time-compressed and the signal of side panel portions are time-expanded such as described in U.S. Pat. No. 4,782,383.

In general, considering the viewpoint of frequency domain, the time-expansion process at the receiving side corresponds to the process in which the signal spectrum is compressed to the low side. For example, the signal spectrum from 0 to 4 MHz is time-expanded by the factor of 4. It is then converted to a signal spectrum of from 0 to 1 MHz. This correlation is applied to the noise signal which is superimposed on the television signal during transmitting. For example, noise of a density of n is superimposed on the transmission path band width from 0 to 4 MHz. After the time-expansion by the factor of 4 is performed to the noise spectrum, a noise signal of a density of 4 n is superimposed on the transmission path which has a band width of from 0 to 1 MHz. The visual sensitivity of the high band is dropped because of the noise spectrum. For evaluating the noise spectrum, many kinds of the noise spectrum evaluation curves exist. A curve which is recommended by CCIR (the abbreviation of French word "Comite Consultatif International des Radiocommunications") is one of them.

Thus, when the compressed side panels of a compatible wide screen signal are expanded in a widescreen receiver, there results a noticeable difference between the resolution or high frequency content of the center portion of a displayed widescreen picture and the side panels. This is due to the expanded noise present in the side panel signal portions.

SUMMARY OF THE INVENTION

Accordingly, it is an object of the present invention to provide an improved compatible widescreen television system which prevents the degradation of the visual signal-to-noise ratio and in which the change of the contents of the television signal is capable of being substantially averted.

According to this invention, there is provided a compatible widescreen television signal transmission system which includes a device for separating a widescreen television signal into a center panel signal component and left and right side panel signal components and a device for time-expanding the center panel signal. The system further includes a device for time-compressing and preemphasizing the left and right side panel signal and a device for time-division multiplexing the time-expanded center panel signal component with the time-compressed and preemphasized side panel signal components. The multiplex signal is encoded in accordance with a standard television signal and is transmitted.

According to this invention, there is further provided a compatible widescreen television signal receiving system which includes a device for decoding a received encoded television signal having a time-expanded center panel signal component and time-compressed and preemphasized left and right side panel signal components and a device for time-division demultiplexing the center panel signal component and the left and right side panel signal components. The system further includes a device for time-compressing the center panel signal component and a device for deemphasizing and time-expanding the left and right side panel signal components. Thus, the compatible widescreen television signal is composed of the time-compressed center panel signal component and the time-expanded and deemphasized left and right side panel signal components.

BRIEF DESCRIPTION OF THE DRAWINGS

These and other objects and advantages of this invention will become more apparent from the following detailed description of the presently preferred embodiment of the invention, taken in conjunction will the accompanying drawings of which.

DETAILED DESCRIPTION OF THE PREFERRED EMBODIMENT

The preferred embodiment of the present invention will now be described in more detail with reference to the accompanying drawings.

Figure 1:
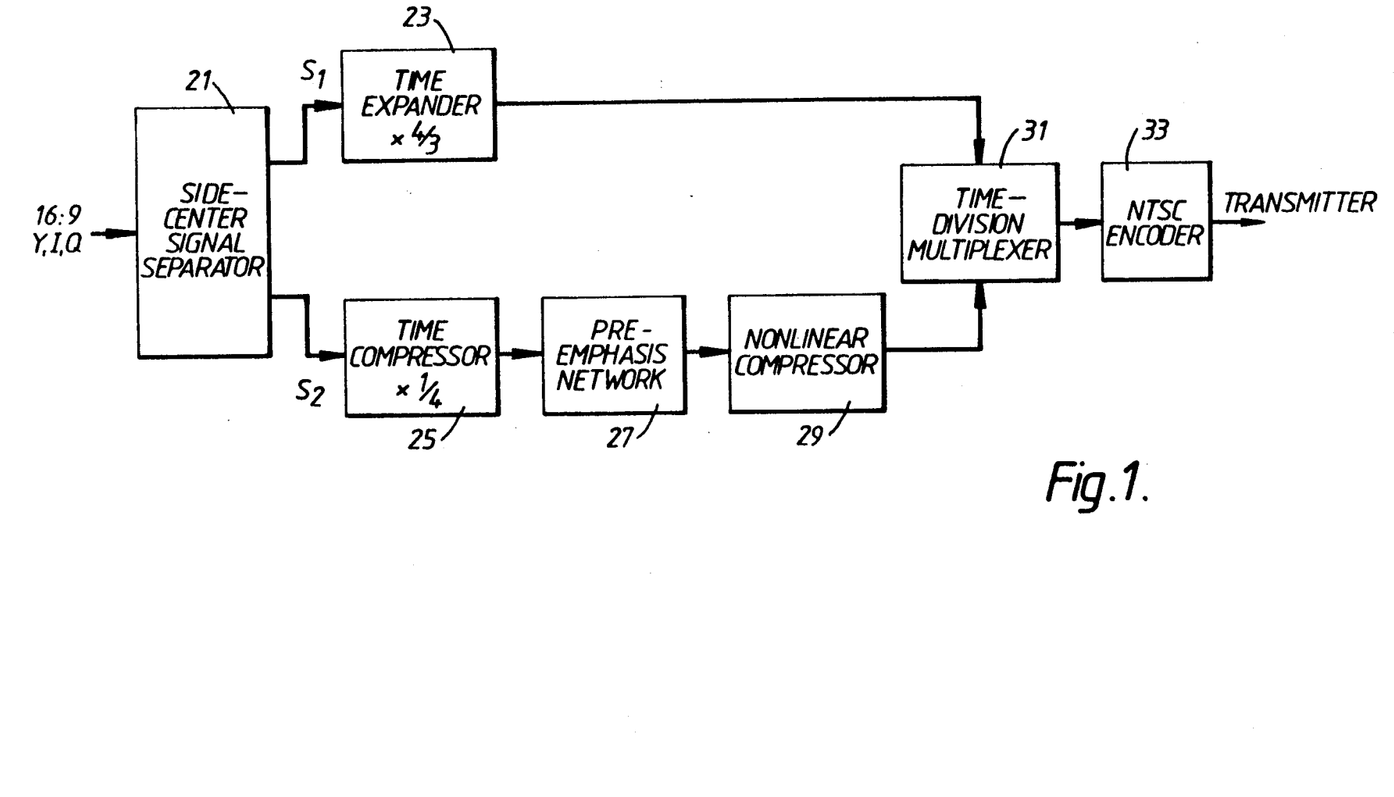
FIG. 1 is a block diagram of a portion of a transmitter in accordance with the present invention.

In an exemplary embodiment of the present invention, as illustrated in FIG. 1, there is provided a transmitting portion of a widescreen television system. A wide aspect ratio e.g., 16:9, television signal having left side, right side and center video information panels such as may be obtained from cameras, film chains, video tape recorders or the like, is applied to a transmitting portion.

Figure 3:
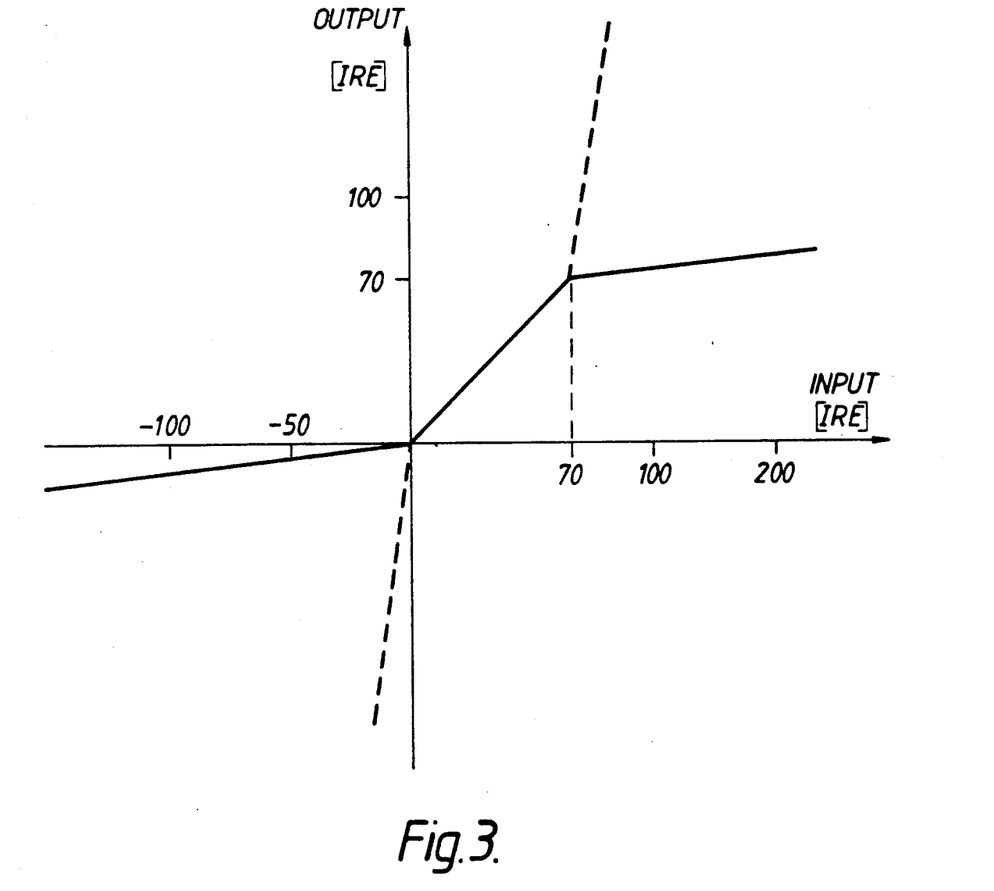
FIG. 3 is a graph illustrating the input-output characteristic of the nonlinear compressor shown in FIG. 1 and the nonlinear expander shown in FIG. 2.

Specifically, a luminance component Y and color difference signal component I and Q of the widescreen television signal are supplied to a side-center signal separator 21, respectively. The side-center signal separator 21 is conventional in design and construction. At the side-center signal separator 21, a widescreen television signal is separated into the center panel information S1 and the side panel information S2. The side panel information S2 comprises left and right side panel information. The center panel signal S1 is supplied to a time expander 23. In order to achieve compatibility of the widescreen signal and the existing standard NTSC signal, the center panel information S1 is time-expanded by the factor of 4/3. Thus, the center panel information S1 is converted to a signal which has an aspect ratio of 4:3. The signal which is time-expanded at the time-expander 23 is supplied to one input terminal of a time-division multiplexer 31. On the other hand, the left and right side panel signals S2 are supplied to a time compressor 25, and time-compressed. In this embodiment, the factor of the time compressing is defined as ¼, although other factors may be optionally selected based on system parameter. The signals S2 which are time-compressed at the time compressor 25 are supplied to a preemphasis network 27. At the preemphasis network 27, the high frequency portions of the left and right side panel signals S2 are emphasized. The quantity of preemphasis is preset corresponding to the signal to noise ratio, which is deteriorated because of the time expansion. The output signal from the preemphasis network 27 is supplied to a nonlinear compressor 29. Preferably, the nonlinear compressor 29 is designed to have an input-output characteristic as represented by the continuous line shown in FIG. 3. Thus, the left and right side panel signals S2 are compressed nonlinearly by the nonlinear compressor 29. This compression is done because of the probability that the level of the signals S2 may exceed the normal transmitting dynamic range. The output signal of the nonlinear compressor 29 is supplied to the other input terminal of the time-division multiplexer 31. As a result, the time-expanded center panel signal S1 and the non-linear time-compressed side panel signals S2 are time-division multiplied. The output signal of the time-division multiplexer 31 is supplied to a NTSC encoder 33. Thus, the time division multiplexed signal is converted to an NTSC standard signal.

Figure 4:
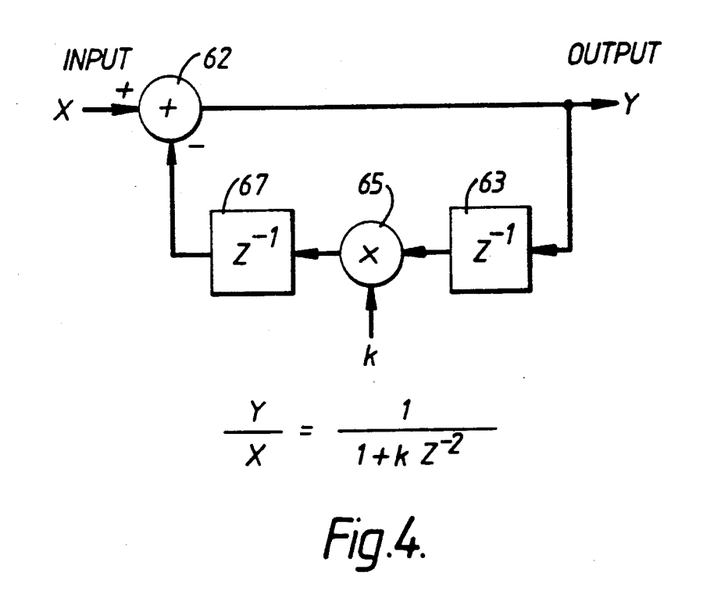
FIG. 4 is a block diagram of the pre-emphasis network shown in FIG. 1.

A detailed construction of the prefered preemphasis network 27 is illustrated in FIG. 4. The preemphasis network 27 includes an adder 62, unit-delay elements 63 and 67 and a multiplier 65. Fathermore, the preemphasis network 27 is constructed as type of a recursive, infinite impulse response (IIR) filter. The compressed side panel signals S2 are input to an input terminal of the preemphasis network 27. Thus, this input signal is supplied to the adder 62. As a result, the output signal of the unit-delay element 67 is subtracted from the side panel signals S2 at this adder 62. The subtracted signal is output from an output terminal of the preemphasis network 27. Fathermore, the subtracted signal is supplied to the multiplexer 65 through the unit-delay element 63. The signal which is supplied to the multiplier 65 is multiplied by the factor of k and supplied to the adder 62 through the unit-delay element 67. The factor k is selected based on the quantity of preemphasis desired. Basically, the factor k is preset as a fixed number, but it is possible to adopt a variable number. Assuming that the delayed operator is $Z^{-1}$, the transfer characteristic of the preemphasis network 27 is defined by the expression.

$$Y/X = 1/(1 + kZ^{-2}) \qquad (1)$$

Figure 5:
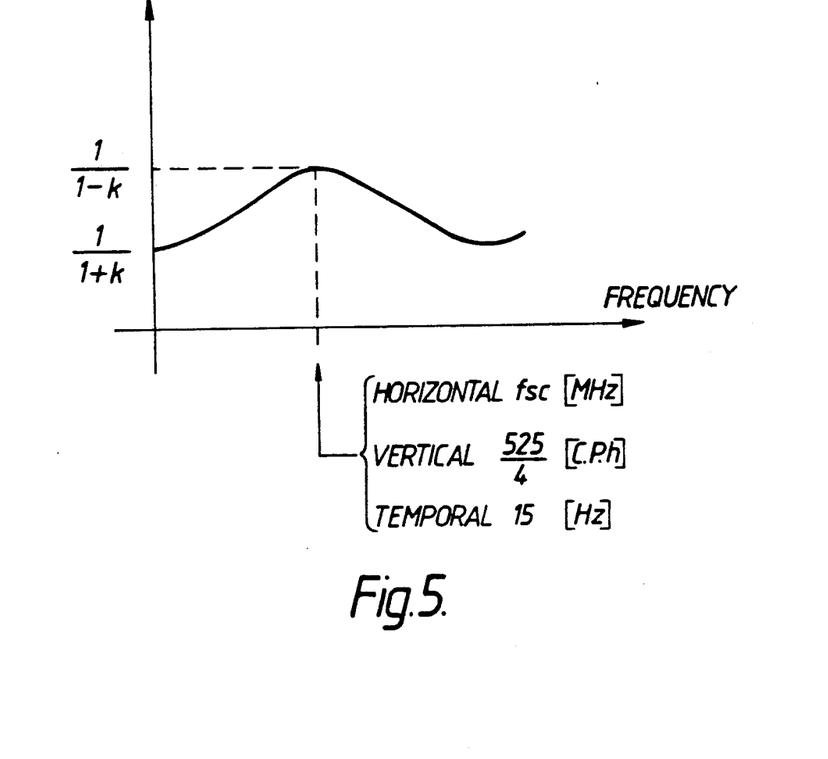
FIG. 5 is a graph illustrating the transfer characteristic of the pre-emphasis network shown in FIG. 4.

The transfer characteristic of the preemphasis network 27 is illustrated in FIG. 5. As shown in FIG. 5, a maximum value of preemphasis is $1/(1-k)$ in the preemphasis network 27. As a result, the level of the high frequency component of the time-compressed side panel signals S2 is multiplexed by the factor of $1/(1-k)$. If the factor k is preset as a larger number, the level of the high frequency component will become too large and there is a possibility for saturation. However, this problem may be solved by combined preemphasis processing of the horizontal, vertical and temporal signals. Thus, it is possible to improve the signal to noise ratio sufficiently without adopting a large number for k. Specifically, because of the spectrum difference between the center panel signal S1 and the side panel signals S2, a sufficient peak value for each preemphasis processing is about 2. Therefore, the number of the factor k is selectable within the range as followed.

$$0 \leq k \leq \tfrac{1}{2}$$

The preemphasis network 27 for the horizontal signal may be constructed so that the delayed operator $Z^{-1}$ of the unit-delay element 63 and 67 is one picture element period. In this case, the transfer characteristic of the preemphasis network 27 has its maximum point at a color subcarrier frequency $f_{sc}$. The preemphasis network 27 for the vertical signal may be constructed so that the delayed operator $Z^{-1}$ of the unit-delay elements 63 and 67 should is line period. In this case, the transfer characteristic of the preemphasis network 27 has its maximum point at 525/4 [c.p.h.]. The preemphasis network 27 of the temporal signal may be constructed so that the delayed operator $Z^{-1}$ of the unit-delay elements 63 and 67 is one field period. In this case, the transfer characteristic of the preemphasis network 27 has its maximum point at a 15 [Hz].

Figure 2:
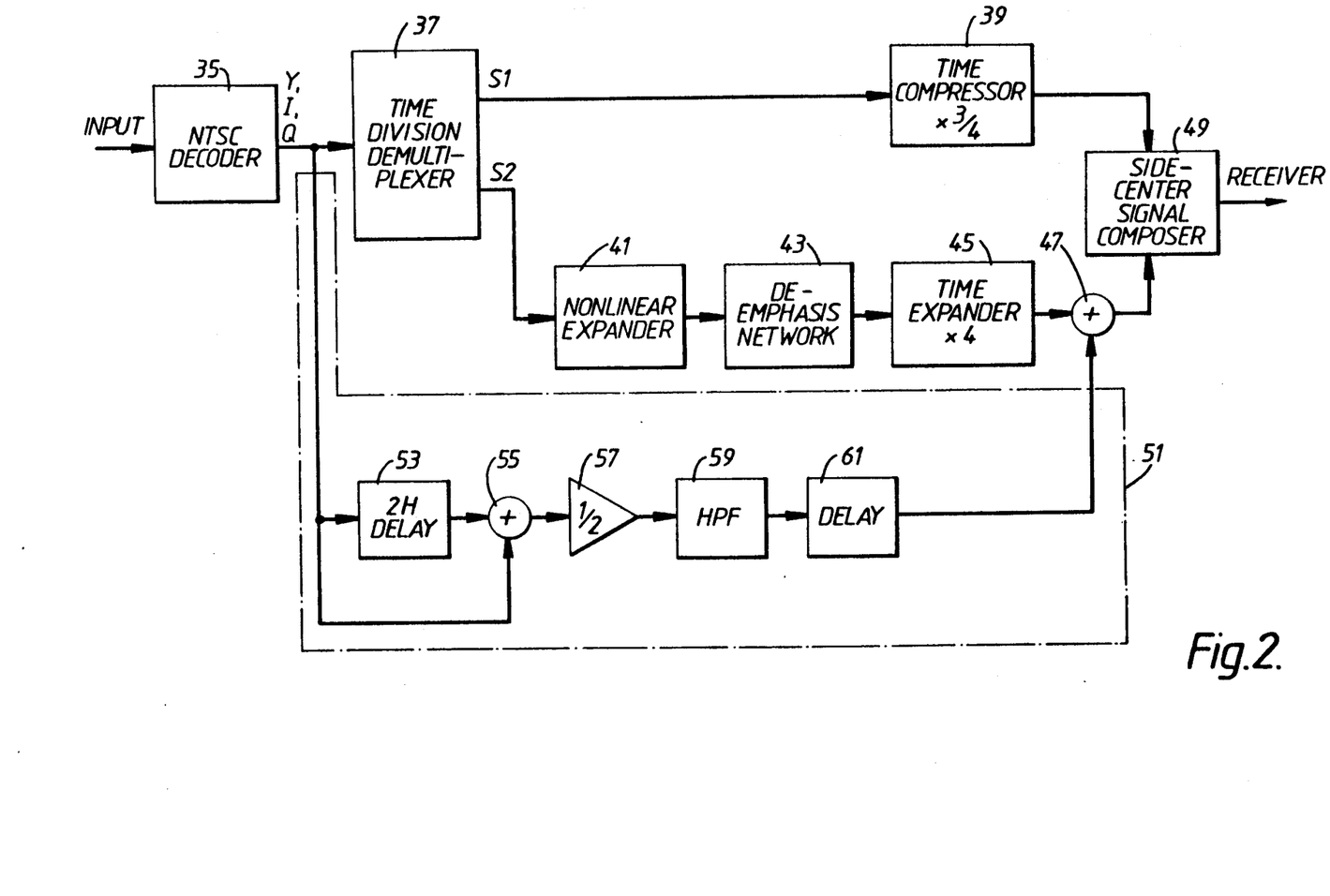
FIG. 2 is a block diagram of a portion of a receiver used for receiving signals transmitted by the transmitter of FIG. 1.

Referring now to FIG. 2, illustrated there is a receiving portion of a widescreen television system. The compatible widescreen signal is received by an antenna (not shown) and applied to an input terminal of a NTSC decoder 35. The received signal is decoded to the luminance signal Y and the color difference signal I and Q, respectively, in the NTSC decoder 35. This decoded signal is applied to a time-division demultiplexer 37. At the time-division demultiplexer 37, the decoded signal is separated into the center panel information S1 and the side panel information S2. The side panel information S2 comprises the left and right side panel information. The center panel signal S1 is supplied to a time-compressor 39. Thus, the center panel signal S1 is time-compressed by the factor of $\frac{3}{4}$. As a result, the center panel signal S1 is restored to its original state. The signal which is output by at the time-compressor 39 is supplied to one input terminal of a side-center signal composer 49. On the other hand, the left and right side panel signals S2 are supplied to a nonlinear expander 41. Preferably, the nonlinear expander 41 is designed to have an input-output characteristic represented by the broken line in FIG. 3. Thus, the left and right side panel signals S2 are amplitude expanded nonlinearly in the nonlinear expander 41. This process corresponds to the nonlinear compression processing which is performed in the transmitting portion by nonlinear compressor 29. The expanded signal is supplied to a deemphasis network 43 and deemphasized. This deemphasis network 43 is designed to have a characteristic which is the reverse of the characteristic of the preemphasis network 27. Therefore, the noise component of the signal S2 is decreased. The deemphasized signal is supplied to a time expander 45. The side panel signals S2 are then time-expanded by a factor of 4. Here, the magnitude of the expanding factor is chosen to be the reciprocal of the factor in the time compressor 25. The time-expanded side panel signals S2 are supplied to a side-center signal composer 49 through an adder 47. As a result, the time-expanded side panel signals S2 and the time-compressed center panel signal S1 are composed. The widescreen television signal the aspect ratio of which is wide e.g., 16:9, is reproduced and supplied to the widescreen display equipment (not shown).

Figure 6:
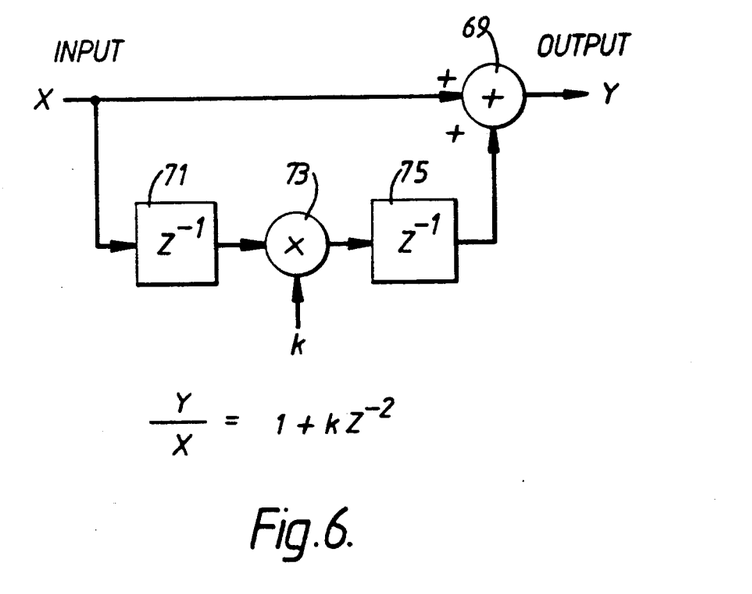
FIG. 6 is a block diagram of the de-emphasis network shown in FIG. 2.

One construction of the deemphasis network 43 is illustrated in FIG. 6. The deemphasis network 43 includes an adder 69, unit-delay elements 71 and 75 and a multiplier 73. Furthermore, the deemphasis network 43 is constructed as type of a non-recursive, finite impulse response (FIR) filter. The nonlinear expanded side panel signals S2 are input to an input terminal of the deemphasis network 43. Thus, the input signals S2 are respectively applied to the adder 69 and the unit-delay element 71. The output signal of the unit-delay element 71 is applied to the multiplier 73 and multiplied by the factor of k. The multiplied signal is then delayed in the unit-delay element 75. This delayed output signal is applied to the adder 69 and additively combined with the nonlinear expanded side panel signals S2. Thus, the combined signal is output as a deemphasized signal from the deemphasis network 43. Assuming that the delay operator of the unit-delay elements 71 and 75 are, respectively, $Z^{-1}$, the transfer characteristic of the deemphasis network 43 is defined by the following expression.

$$Y/X = 1 + kZ^{-2} \quad (2)$$

Figure 7:
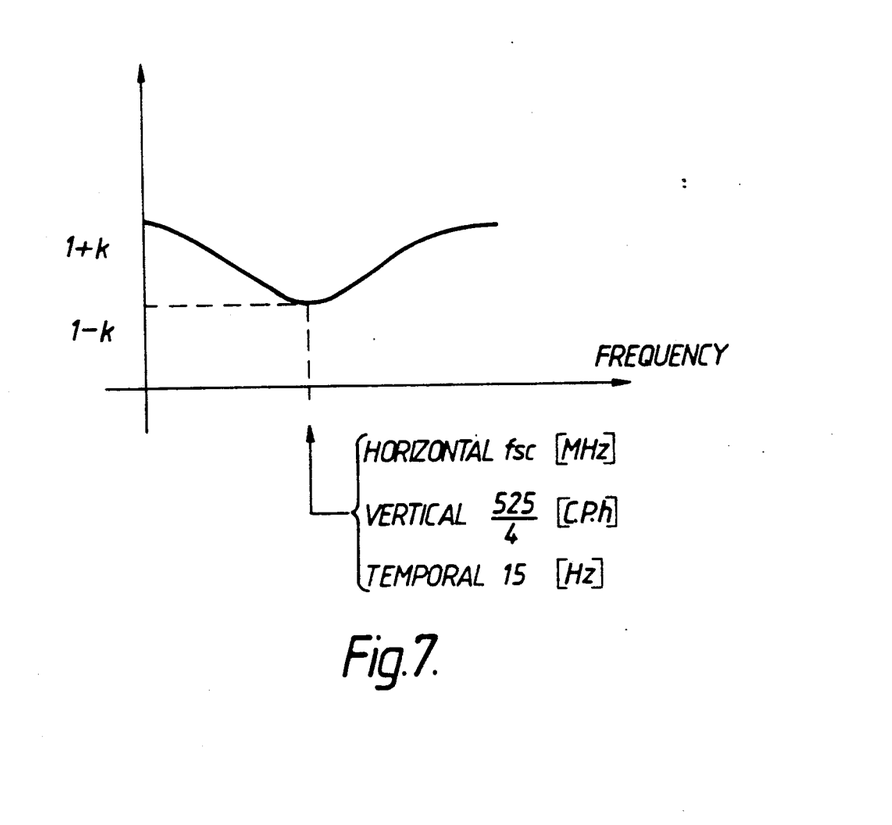
FIG. 7 is a graph illustrating the transfer characteristic of the de-emphasis network shown in FIG. 6.

The transfer characteristic of the deemphasis network 43 is illustrated in FIG. 7. As shown in FIG. 7, a minimum value of deemphasis is $1-k$ in the deemphasis network 43. The overall characteristic of the system owing to the preemphasis process in the transmitting side and the deemphasis process in the receiving side, is defined as follows.

$$\{1/(1+kZ^{-2})\} \times (1+kZ^{-2}) = 1 \quad (3)$$

Figure 8:
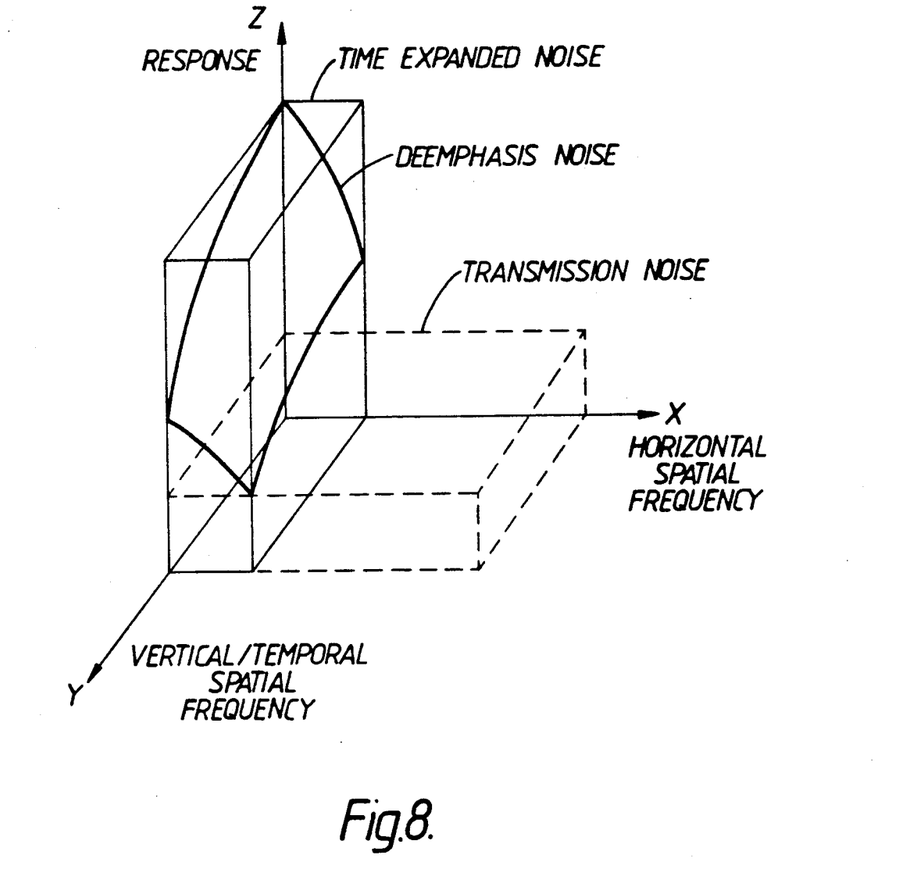
FIG. 8 is a graph illustrating the de-emphasis characteristic of the de-emphasis network shown in FIG. 6.

Therefore, any troubles because of temporal processing will not occur, even in the case of motion mode pictures. Thus, there is no necessity for using motion adaptive processing such a noise reduction processing which may be conventionally used. In the deemphasis network 43, when the delay operator $Z^{-1}$ of the unit-delay elements 71 and 75 are appropriately preset, it is capable of performing the horizontal, vertical and temporal filter processing, respectively. FIG. 8 illustrates a preferable example of the deemphasis characteristic of the deemphasis network 43. It shows a characteristic of two dimensional, horizontal-vertical, processing. In FIG. 8, the Z axis indicates response, X axis indicates horizontal spatial frequency and the Y axis indicates vertical spatial frequency, respectively. A bold continuous line indicates two dimentional deemphasis characteristic. A broken lined rectangular prism represents the transmitting noise signal. By means of time expansion processing, such transmitting noise signal is converted into a noise signal which is represented as a continuous lined rectangular prism. Fathermore, under the two dimensional horizontal-vertical deemphasis processing, the noise power is decreased. In FIG. 8, if the Y axis indicates temporal spatial frequency, the deemphasis network 43 is capable of having a two dimensional, horizontal-vertical, deemphasis characteristic.

Figure 9A:
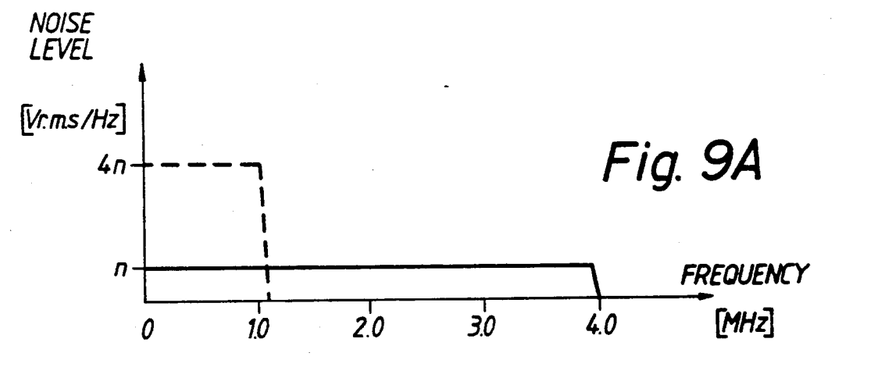
FIGS. 9A through 9C are graphs of explaining a noise spectrum accompany with de-emphasis process.
Figure 9B:
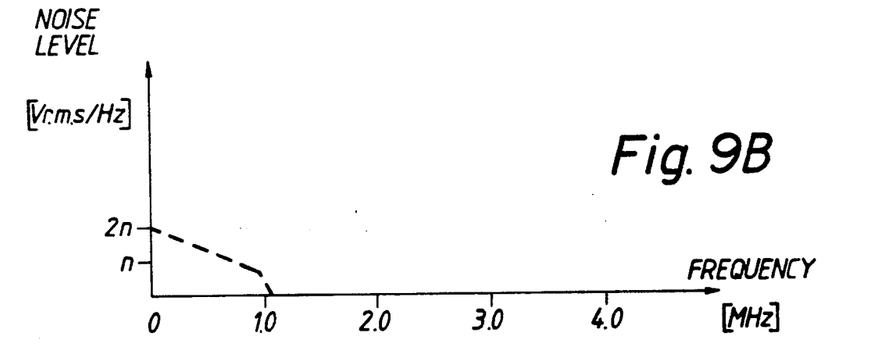
Figure 9C:
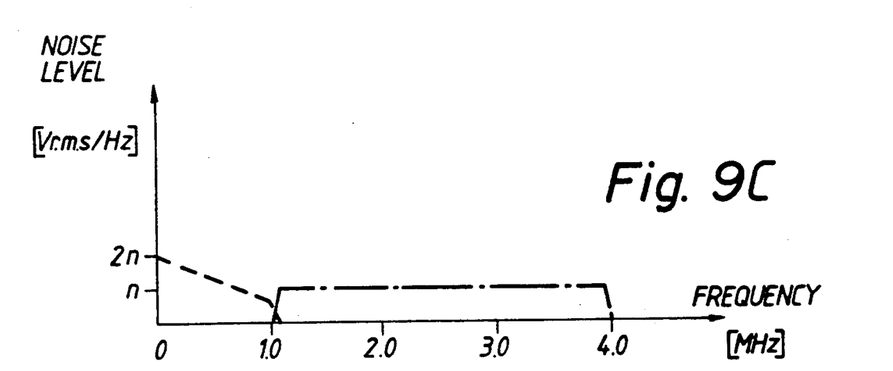

FIG. 9 illustrates a noise spectrum which is represented in one dimension. In FIG. 9A, a continuous line indicates the noise signal which is present in the time-division multiplexed side panel signals S2 during transmitting. The time-expand process will convert the noise signal into a signal represented by the line in FIG. 9A. As shown, the noise signal is converted to be within a low frequency region. In FIG. 9B, a broken line indicates the noise signal after a three dimensional deemphasis process has been performed. As will be seen from FIG. 9B, the noise signal from the side panel signals S2 exists in the low frequency region, but does not exist in the high frequency region. On the other hand, the noise signal which is present in the center panel signal S1, illustrated as a chain line in FIG. 9C, exists equally in the low to high frequency range. Therefore, the visual signal to noise ratio of the side panel signals S2 is superior to the visual signal to noise ratio of the center panel signal S1 because no noise signal exists in the high frequency region of signals S2. As a result, a difference in the visual signal to noise ratio will come about between the center panel signal S1 and the side panel signals S2. Thus, an unnatural widescreen picture, having a seam between the center panel and the side panels, will be reproduced.

Figure 10A:
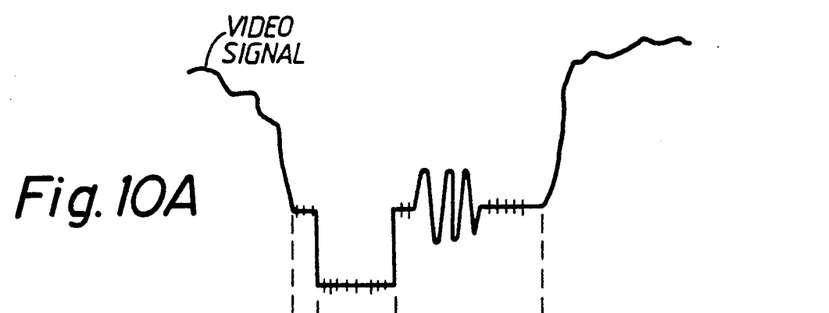
FIGS. 10A through 10C are waveform diagrams helpful in understanding the operation of the compensate unit of FIG. 2.
Figure 10B:
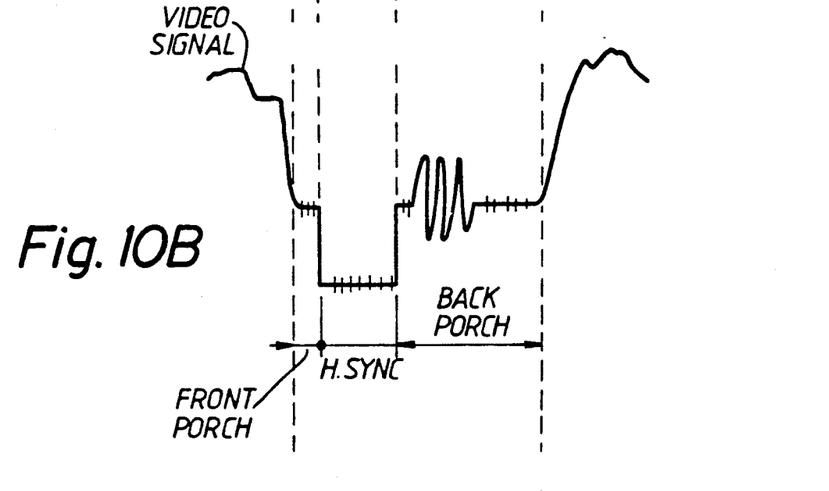
Figure 10C:
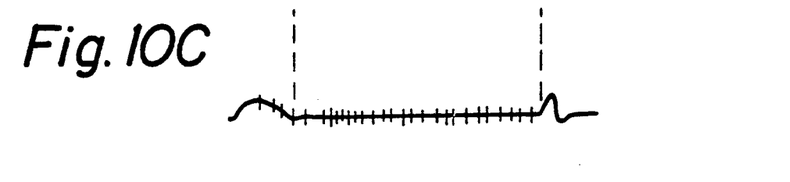

Returning to FIG. 2, a circuit for the correction of this problem is illustrated. The decoded signal of the NTSC decoder 35 is also applied to an input terminal of a compensating unit 51. The compensate unit 51 includes a two line delay circuit 53, an adder 55, an attenuator 57, a high pass filter 59 and a delay circuit 61. The two line delay circuit 53, having a two horizontal scan period delay factor, receives the decoded signal. The decoded signal is also applied to the adder 55. When an input signal and an output signal of the delay circuit 53 are such as shown in FIG. 10A and FIG. 10B respectively, these signals are combined in the adder 55 by subtracting the input signal from the delayed signal. As a result, the horizontal synchronizing signal and color burst signal cancel each other and a combined signal having noise and video components such as shown in FIG. 10C is output. The combined signal is applied to the attenuator 57 and is attenuated by the attenuator 57, which exhibits a signal gain of 0.5. The attenuated signal is applied to the high pass filter 59 and is filtered. Thus, the noise signal in the high frequency region is extracted. To adjust the timing, the noise signal is delayed for a prescribed period in the delay circuit 61. The delayed noise signal is then applied to the adder 47 and is included with the time-expanded side panel signals S2. Thus, side panel signals S2 having noise signals such as illustrated with a broken line and a chain line in FIG. 9C, are reproduced. As a result, the difference in the visual signal to noise ratio is canceled in substance between the center panel signal S1 and the side panel signals S2. Thus, a clear widescreen picture is presented, with no noise bands between the center and side portions.

Numerous other modifications and variations of the present invention are possible in light of the above teachings. It is therefore to be understood that, within the scope of the appended claims, the present invention can be pacticed in a manner other than as specifically described herein.

What is claimed is:

1. A compatible widescreen television signal transmission system comprising:
    a signal having a center panel signal component and left and right side panel signal components;
    means for separating said widescreen television signal into said center panel signal component and said left and right side panel signal components;
    means for time-expanding said center panel signal component;
    means for time-compressing said left and right side panel signal components;
    means for preemphasizing said time-compressed left and right means for time-division multiplexing said time-expanded center panel signal component with said time-compressed and preemphasized side panel signal components;
    means for encoding said multiplex signal in accordance with a standard television signal; and
    means for transmitting said encoded signal.

2. The system of claim 1 further including means for nonlinearly compressing said time-compressed and preemphasized side panel signal components.

3. The system of claim 1, wherein said time-expanding means expands said center panel signal components by the factor of 4/3.

4. The system of claim 1, wherein said time-compressing means compresses said left and right side panel signal components by the factor of ¼.

5. The system of claim 1, wherein said preemphasizing means comprises a recursive network.

6. The system of claim 1, wherein said preemphasizing means includes a summing means, a first delay means, a multiplying means and a second delay means, wherein the summing means operates to subtract a second signal from a first signal which is an input to said preemphasizing means and to output the resulting signal as said preemphasized signal, the first delay means operates to delay the output of said summing means by a specified period, the multiplying means operates to multiply said delayed output of said first delay means by a prescribed coefficient, and the second delay means operates to delay the output of said multiplying means by said specified period and to output that delayed signal as said second signal.

7. A compatible widescreen television signal having a center panel signal component and left and right side panel signal components, further comprising:
    means for separating said widescreen television signal into said center panel signal component and said left and right side panel signal components;
    means for time-expanding said center panel signal component;
    means for preemphasizing said left and right side panel signal components;
    means for time-compressing said preemphasized left and right side panel signal components;
    means for time-division multiplexing said time-expanded center panel signal component with said time-compressed and preemphasized side panel signal components;
    means for encoding said multiplex signal in accordance with a standard television signal; and
    means for transmitting said encoded signal.

8. A compatible widescreen television signal receiving system comprising:
    means for receiving an encoded widescreen television signal having a time-expanded center panel signal component and time-compressed and preemphasized left and right side panel signal components;
    means for decoding said received television signal;
    means for time-division demultiplying said decoded signal into said center panel signal component and said left and right side panel signal components;
    means for time-compressing said center panel signal component;
    means for deemphasizing said left and right side panel signal components;
    means for time-expanding said deemphasized left and right panel signal components;
    means for composing the widescreen television signal of said time-compressed center panel signal component and said time-expanded and deemphasized left and right side panel signal components.

9. The system of claim 8, further including means for supplying the composed widescreen television signal to a receiver.

10. The system of claim 8, further including means for nonlinearly expanding said time-division demultiplied left and right side panel signal components.

11. The system of claim 8, wherein said time-compressing means compresses said center panel signal component by the factor of ¾.

12. The system of claim 8, wherein said time-expanding means expands said left and right side panel signal components by the factor of 4.

13. The system of claim 8, wherein said deemphasizing means comprises a nonrecursive network.

14. The system of claim 8, wherein said deemphasizing means includes a first delay means, a multiplying means, a second delay means and a summing means, wherein the first delay means operates to delay an input signal thereof by a specified period, the multiplying means operates to multiply said delayed output of said first delay means by a prescribed coefficient, the second delay means operates to delay the output of said multiplying means by said specified period, and the summing means operates to sum said delayed signal output from said second delay means and said input signal.

15. The system of claim 8, further including means for compensating for differences in the signal to noise ratio of said center panel signal component and said left and right side panel signal components.

16. The system of claim 15, wherein said compensating means includes a first delay circuit, an adder circuit, an amplifier circuit, a high pass filter circuit and a second delay circuit, wherein the first delay circuit, having a two horizontal scan period delay factor, receives said decoded signal the adder circuit combines by substraction said decoded signal from said two horizontal scan period delayed signal, the amplifier circuit attenuates said combined signal by a signal gain of 0.5, the high pass filter receives said attenuated signal and extracts a noise signal in the high frequency region, the second delay circuit delays said noise signal for a prescribed period.

17. The system of claim 16, wherein said compensating means provides a high frequency noise signal to the widescreen television signal.

18. A compatible widescreen television signal receiving system comprising:
   means for receiving an encoded widescreen television signal having a time-expanded center panel signal component and time-compressed and preemphasized left and right side panel signal components;
   means for decoding said received television signal;
   means for time-division demultiplying said decoded signal into said center panel signal component and said left and right side panel signal components;
   means for time-compressing said center panel signal component;
   means for time-expanding said left and right side panel signal components;
   means for composing the widescreen television signal of said time-compressed center panel signal component and said time-expanded and deemphasized left and right side panel signal components.

* * * * *